April 16, 1946.   W. L. RUSSELL   2,398,562
APPARATUS FOR WELL LOGGING
Filed Dec. 28, 1944   2 Sheets-Sheet 2
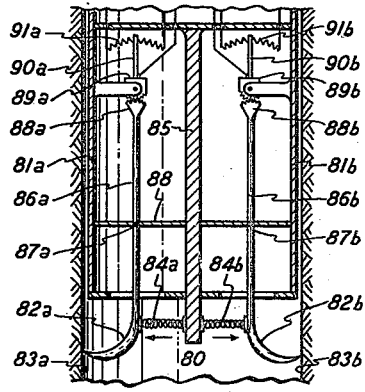
FIG. 4
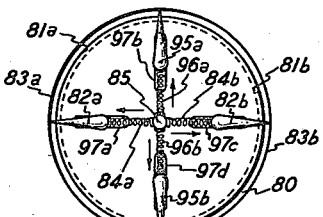
FIG. 4a
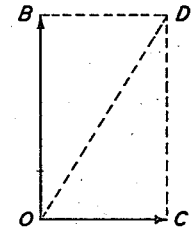
FIG. 6
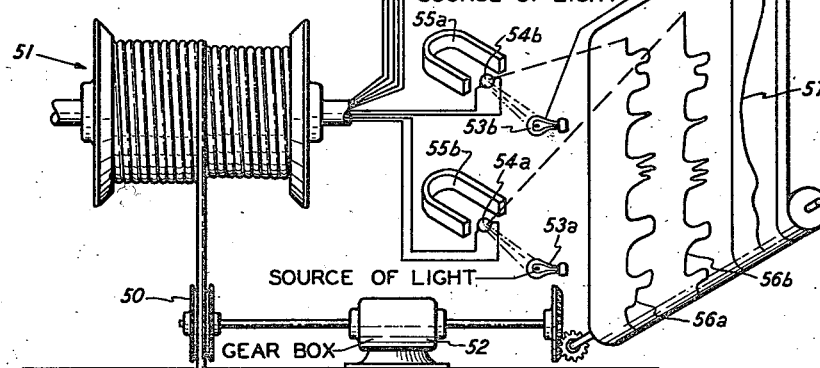
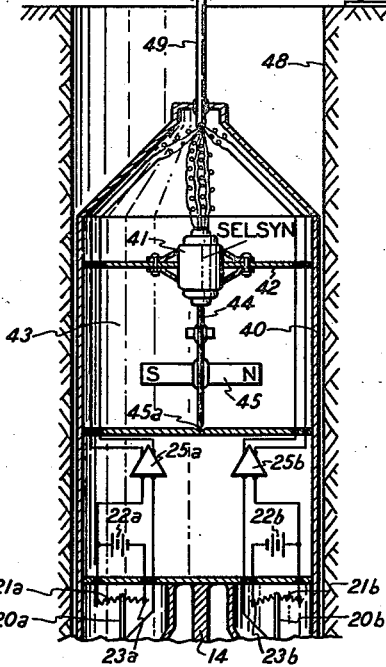
FIG. 2
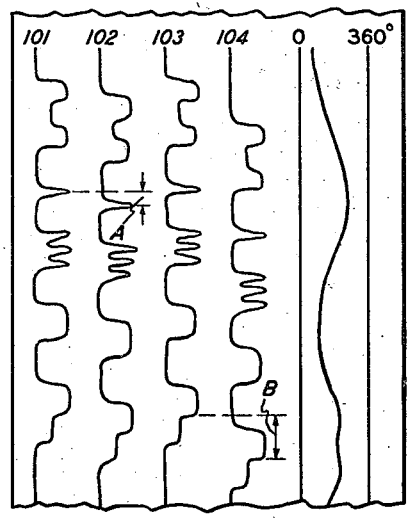
FIG. 5
INVENTOR
William L. Russell Patented Apr. 16, 1946

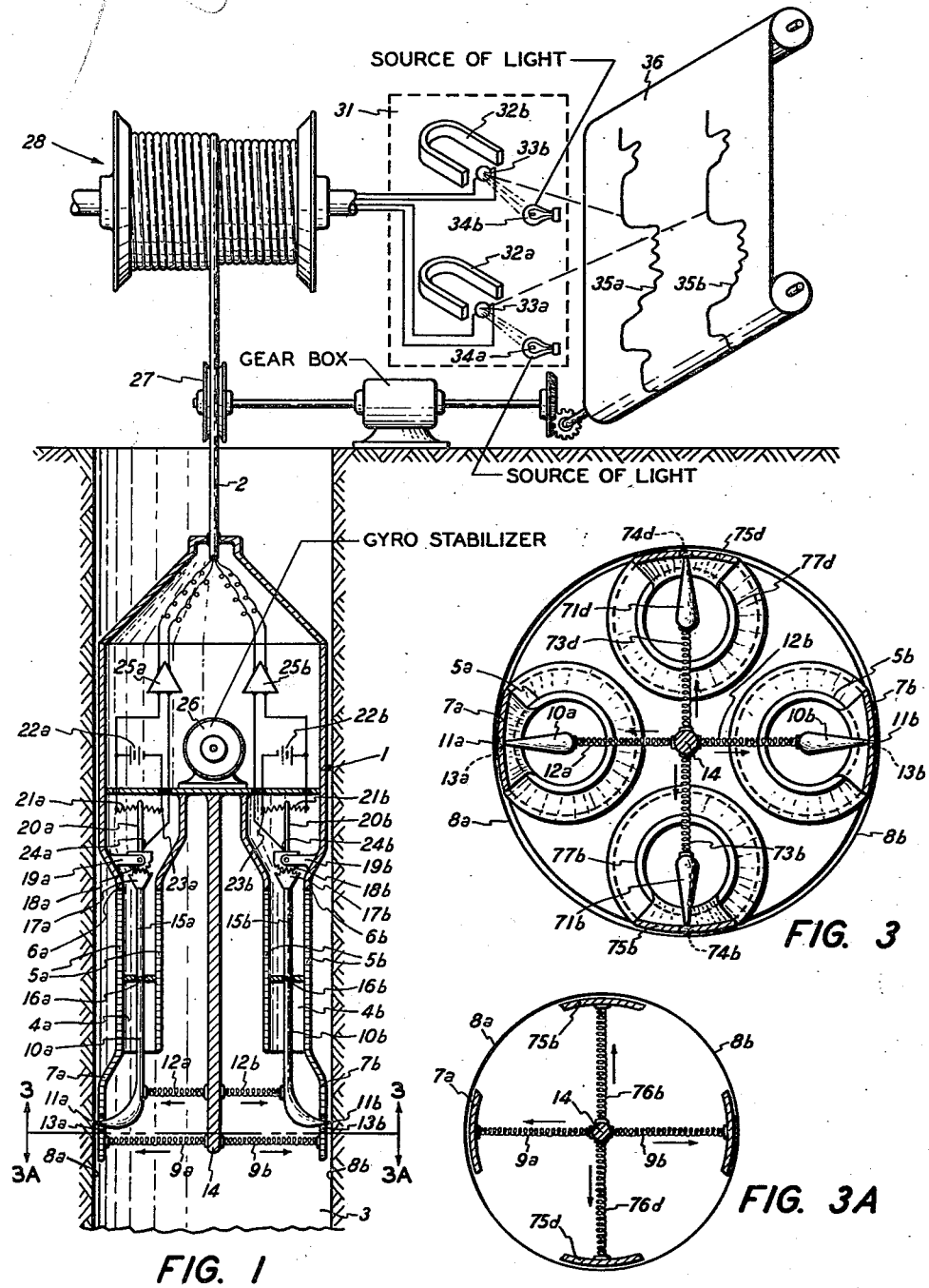

2,398,562

UNITED STATES PATENT OFFICE 2,398,562

APPARATUS FOR WELL LOGGING

William L. Russell, Tulsa, Okla.

Application December 28, 1944, Serial No. 570,135

9 Claims. (Cl. 73—152)

This invention comprises a novel apparatus for determining accurately the amount and direction of the dip by measurements taken in a single bore hole. The great value of an accurate knowledge of the direction and amount of the dip in the strata, especially where steep, has been generally recognized by geologists and engineers engaged in the discovery and development of oil and gas fields and other types of mineral deposits. After a number of wells have been drilled it may be possible to determine the dip from the elevations at which certain persistent strata are encountered, but such methods cannot be used where only one well is available or where the strata cannot be correlated between wells.

The urgent need for an apparatus for accurately determining the dip from measurements in a single well has led to the use of expensive and inaccurate methods to measure it. Attempts have been made to obtain oriented cores, or to orient them by residual magnetism, and Schlumberger has proposed a method which consists in measuring the dip by differences in the depths of potential changes on different sides of the hole. However, the errors of this method amount to 5° or 10°, with the result that it cannot be used at all in the extensive areas where the dip is less than 5°. In order to be of value in these low dip areas, a dip-measuring apparatus will have to indicate accurately very minute differences in the depths of some physical or lithologic characteristic on opposite sides of the hole. For example, in order to measure dips as low as 1% in a 10-inch hole, it would be necessary to measure differences in depths of changes in some property on opposite sides of the hole amounting to only 0.1 inch. Clearly this demands a property which changes sharply within minute distances and an apparatus which is capable of measuring very accurately the differences in the depths of such changes on opposite sides of the hole. The present invention describes an apparatus for measuring variations in hardness to the desired accuracy.

The basic feature of the apparatus consists in pressing blunt and sharp instruments against the walls of the hole. In very hard rocks the sharp instrument will penetrate but little more into the rock than the blunt instrument, while in the soft rocks the sharp instrument will penetrate relatively much farther into the rock than the blunt instrument. Thus, by measuring and recording the relative motion of the blunt and sharp instruments, a record of the variations in hardness along the path of the instruments is obtained.

The significant quality of the two instruments is that one is in contact with the rock in a relatively very small area, while the other (blunt) instrument is in contact with the walls over a relatively large area. This situation may be attained in a number of ways. The instruments may be in rolling contact with the walls, in which case two discs of unequal widths at the edge might be used. The apparatus used in the present invention involves a sharp instrument passing through an aperture in a flat or blunt instrument, both pressed against the walls of the hole by springs. However, it should be understood that this invention is not limited to any of the various types of apparatus mentioned, but consists broadly in the use of blunt and sharp instruments, or instruments of large and small area, or instruments of approximately the same sharpness, but applied with unequal pressures.

It is important that both the sharp and blunt instruments penetrate through the mud sheath or coating of mud lining the walls of the hole in wells drilled by rotary methods. If the pressure of the spring is not sufficient to force the blunt and sharp instruments through the mud sheath and place them in continuous contact with the rock, the blunt instrument should be provided with a scraper or other device to remove the mud sheath along the paths of the instruments.

My invention will be better understood from the further description contained in the appended drawings. Of these drawings, Fig. 1 shows schematically and in partial section the general arrangement of my apparatus which includes a gyroscopic stabilizer as one of its elements. Fig. 2 shows a portion of my apparatus in partial section in which a remote reading magnetic compass or a remote reading gyro-compass is substituted for the gyroscopic stabilizer. Figs. 3 and 3A show sectional views of the lower part of the apparatus, as seen from beneath. Figs. 4 and 4A show the apparatus for determining dip in one well by another method, in which measurements of radius are used, Fig. 4 being in section. Fig. 5 shows imaginary typical logs, to illustrate the method for determining the direction and amount of the dip from an actual example. Fig. 6 is a vector diagram of the dips, to show how the maximum dip and the strike may be determined from the two dips at right angles to each other.

The apparatus lowered down the bore hole contains two pairs of arms or instruments at right angles to each other, and symmetrical about a central vertical axis. Since Figs. 1 and 2 both show vertical sections through one of these two pairs of instruments, each part appears on the drawing twice, once on each side of the central axis. In the following description, both of these identical parts will be referred to by the same number, and the suffix *a* will be used to designate the left hand part; *b* the right hand part.

Referring now to Fig. 1, the logging instrument 1 is suspended by a cable 2 in a circular bore hole 3. At the bottom of the exploring instrument there are two pairs of arms disposed at equal angular distances about the vertical central axis of the instrument. Fig. 1, since it is a cross section, shows only two of these arms, 4*a* and 4*b*. Each arm consists of two instruments, one of which is a tube 5*a* and 5*b*, jointed or flexible at 6*a* and 6*b*, and ending at the base in a blunt or flat portion 7*a* and 7*b*, which is pressed against the walls of the hole 8*a* and 8*b* by the springs 9*a* and 9*b*. The other portion of each arm consists of a sharp instrument 10*a* and 10*b*, ending in a sharp point, 11*a* and 11*b*, which is pressed against the walls of the hole by the spring 12*a* and 12*b*. The point of the sharp instrument passes through openings 13*a* and 13*b* in the blunt instruments. This opening is large enough to permit the sharp instrument to pass through it and to penetrate into the walls of the hole. One terminal of each of the springs is attached to the central bar 14, which extends along the central axis of the instrument.

In very hard rocks the sharp instrument is unable to penetrate appreciably further into the rock than the blunt instrument, but in soft rock the sharp instrument penetrates further into the rock than the blunt instrument, with the result that there is differential motion between the two. These relative displacements of the blunt and sharp instruments depend on the hardness and, consequently, the type of strata penetrated. In the case of shales, for example, the sharp instruments penetrate further into the walls of the hole than in the case of limestone or quartzite. The variations in the amount of relative motion afford an extremely accurate method for measuring the variations in lithologic properties.

As shown in the drawings, the arm 15*a* and 15*b*, holding the sharp instrument, passes through the tube 5*a* and 5*b* and is hinged at 16*a* and 16*b*. The portion of the arm above the hinge is attached to the rack 17*a* and 17*b* which engages a pinion 18*a* and 18*b*, which is hinged at 19*a* and 19*b*. This hinge, like the hinge at 16*a* and 16*b*, is rigidly fastened to the walls of the tube, leaving the pinion free to rotate about the hinge, as the rack moves past it. The pinion is rigidly attached to the pointer or electrical contact 20*a* and 20*b*. This pointer is adapted to be swung by the pinion and to slide over the peripheral resistance wire 21*a* and 21*b*. This resistance wire has its terminals connected to the batteries 22*a* and 22*b*, and receives a current from these batteries. The pointer 20*a* and 20*b*, sliding across the resistance wire 21*a* and 21*b*, constitutes a potentiometer and produces between the terminal 23*a*, 23*b* and the point 24*a*, 24*b* a voltage which is proportional to the distance the pointer has moved over the resistance wire from point 23*a*, 23*b*.

This voltage is proportional to the amount of differential motion between the sharp and blunt instruments. This in turn is true because the motion of the rack past the pinion, and the motion of the pointer over the resistance wire, are both proportional to the differential motion of the blunt and sharp instruments. Where the depth of the wells is considerable, the output voltage produced between points 23*a*, 23*b* and 24*a*, 24*b* may be too small for efficient transmission through the cable 2 to the surface. I, therefore, provide an amplifier 25*a*, 25*b* for amplifying this voltage prior to its transmission to the surface.

As shown in the drawings, the output of the amplifier 25*a*, 25*b* is transmitted through the insulated wires in the cable to the top of the drill hole and is connected to the galvanometer 33*a*, 33*b*. The galvonometer comprises a stationary magnet 32*a*, 32*b* having in its air-gap a movable coil and mirror that are collectively designated as 33*a*, 33*b*, and the movement of these mirrors is proportional to the voltages produced across the outputs of the amplifiers 25*a*, 25*b*. Two sources of light are provided 34*a*, 34*b*, the source 34*b* producing a beam that is reflected in the mirror of 33*b*, while the light beam 34*a* is reflected from the mirror of 33*a*. The light beams which are reflected from the mirrors 33*b* and 33*a*, produce traces 35*b* and 35*a* on the photographic film 36, each of which traces shows deflections proportional to the motions of the mirrors in 33*b* and 33*a*.

As the cable 2 is raised up the hole it is coiled on the drum 28 after having passed over the measuring wheel 27. The measuring wheel is connected to the gear box which winds the photographic film at a rate proportional to the movement of the cable. The two traces 35*a* and 35*b* are, therefore, records of the variation in hardness on opposite sides of the hole. If there is sufficient dip between the two sides, one log will appear lower than the other, and this relative displacement is a measure of the dip.

In order to determine the direction of the dip, it is clearly necessary to know the orientation of the pairs of instruments with reference to the points of the compass. The exploring instrument of the type shown in Fig. 1 does not maintain its orientation spontaneously, but turns about its vertical axis as a result of the twisting of the cable and the impulses given by coming in contact with the walls of the hole. In order to eliminate this difficulty, I am providing a gyroscopic stabilizer 26, which is conveniently located above the exploring instruments and rigidly connected to the frame of the instrument. The purpose of the gyroscopic stabilizer is to maintain the known orientation with which the instrument started down the hole.

Ordinarily it would be desirable to lower the apparatus rapidly down the hole with the arms drawn together or retracted, and to release the springs at the lowest depths to be logged and log upwards. The cable 2, has a length somewhat in excess of the depth of the hole.

It is evident that the two means by which the orientation of the pairs of instruments with reference to the points of the compass may be continuously known are:

(1) Maintaining the orginal orientation by the gyroscopic stabilizer, by the method I have described previously and illustrated in Fig. 1; and (2) by allowing the orientation of the exploring instrument to vary and providing a means of continuously recording the variations in orientation. The apparatus needed for this second method is illustrated in Fig. 2 which shows only the upper portion of the exploring instrument. I do not find it necessary to repeat the lower portion, as it is identical with the corresponding part shown in Fig. 1 except that the gyroscopic stabilizer is omitted. The means for indicating the orientation, is enclosed in the brass housing 40, which is rigidly attached to the housing for the exploring instrument below. Numeral 45 represents an orientable member, which maintains a fixed and known orientation in spite of the rotation of the exploring instrument about its vertical axis. This member, designated by 45, may be either a magnetic compass or a gyroscopic compass. Under ordinary circumstances a magnet, or compass needle, would probably be satisfactory, but in areas where the earth's magnetic field is locally disturbed by deposits of magnetite or other magnetic materials, the directional gyro should be substituted for the magnet or compass needle.

The compass needle or magnet having a north-south pole 45, is supported on a shaft 44 and pivot bearing 45a. The magnet is made to control the angular position of an instrument Selsyn 41 or any other well known instrument for indicating angular position at a distance. In order to prevent undue oscillation of the magnet, it is immersed in a liquid 43, which acts as a damping means. The Selsyn 41 is connected in the conventional manner by means of five electrical conductors to another Selsyn 58, and to the gear and lever arrangement 59 and recorder 60, which produces the graph 57. This graph indicates continuously the angular position of the instrument housing 40, with reference to the compass or directional gyro 45, both of which will maintain a known orientation continuously. The graph 57 may therefore be used to determine the direction of the dip from the two pairs of logs showing variations in hardness.

Figures 3 and 3A show views of the apparatus as seen from below looking up the hole. In Fig. 3A the arrangement of the springs actuating the blunt instruments are shown, while Figure 3 shows a view of the remainder of the lower portion of the instruments, with the springs 76b, 9b, 76d, and 9a removed to permit better vision. In Figs. 3 and 3A, 71d, 10b, 71b, and 10a represent the sharp instruments pressed against the walls of the hole, 8a, 8b, by the four springs, 73d, 12b, 73b and 12a. The sharp instruments pass through the perforations 74d, 11b, 74b, and 11a in the flat parts 75d, 7b, 75b, and 7a of the blunt instruments. These flat portions of the blunt instruments are pressed against the walls of the hole by the springs 76d, 9b, 76b, 9a. The four tubes through which the sharp instruments extend are shown by 77d, 5a, 77b, and 5b. Numeral 14 indicates the central rod to which the springs are attached.

Another device for determining the dip in one well consists in measuring the displacements due to the dip of the variations in radius on opposite sides of the hole. When the displacements are measured in this manner, the blunt instrument may be dispensed with, or, the whole body of the apparatus may be considered as the blunt instrument. The apparatus needed for this method is shown in Figs. 4 and 4A. Fig. 4 shows a vertical cross-section through a plane comprising a pair of calipers. The upper portions of the apparatus are not shown, as they are identical with those shown in Figs. 1 and 2. In Fig. 4 numeral 80 represents a bore hole, 81a, 81b the housing of the instrument, 82a, 82b a sharp instrument pressed against the walls of the hole, 83a, 83b by the springs 84a, 84b, which are attached to the central bar 85. This central bar is rigidly attached to the main body of the instrument. As the apparatus is drawn up the hole, the point of the sharp instrument is in places pushed by the springs further from the central bar 85, while in places the sharp point is withdrawn towards the bar 85. The shafts 86a, 86b of the sharp instruments are hinged at 87a, 87b, where they pass through the partition 88, which may also be used to exclude mud, salt water and other fluids in the bore hole from the inner portions of the apparatus. As the point of the sharp instrument moves towards and away from the central bar 85, the motion is transmitted to the rack 88a, 88b, which moves the pinion 89a, 89b. This pinion in turn moves the pointer or electrical contact 90a, 90b over the resistance wire 91a, 91b. The variations in potential are produced in the same manner as in the apparatus illustrated in Figs. 1 and 2, and are caused to produce a graphic log at the surface in the same manner as previously described.

Fig. 4A shows a view of the apparatus as seen from below looking up the hole. Numeral 80 represents the well bore, 81a, 81b the housing of the apparatus, 82a and b and 95a and b the sharp instruments, impelled against the walls of the hole by the springs 84a and b, and 96a and b. The slots 97a, b, c, and d, are cut in the bottom of the housing of the apparatus, and allow the instruments to project below the base of the housing and to move radially to and fro from the center of the bore hole.

Since the springs continually impel the sharp instruments away from the central axis of the bore hole, they will move outward until they meet the walls of the bore hole. Whether or not they penetrate into the walls depends on the hardness of the rock, the sharpness of the points of the sharp instruments, and the force or pressure produced by the springs. The forces of the springs and the sharpness of the points of the sharp instruments may be adjusted so that the points of the instruments follow the surface of the walls of the bore hole without penetrating into the rock, or, by the use of greater pressures and sharper points, the sharp points may be used to penetrate into the rock.

In the first case, in which the instruments do not penetrate into the rock, the motion of each arm is clearly proportional to the variations in the radius of the bore hole along the path traversed by that particular arm. The variations in voltage transmitted to the surface, and the displacements on the resultant graphic record, are therefore also proportional to the said variations in radius. The comparison of the depths of the variations in radius on opposite sides of the hole will therefore indicate any displacements in the depths of these variations by the dip of the strata.

In some formations the strata consist of alternations of relatively resistant, relatively erosive, or relatively soluble and insoluble layers. In such rocks there is naturally some tendency for the more resistant layers to project from the average surface of the wall of the hole and for the layers which are more soluble, or more easily erosive, to be marked by indentations in the surface. In such cases the records of the variations in the radii of the hole on opposite sides will be displaced up or down by the dip, and may be used to determine the dip in the same manner as the variations in hardness, as has been previously described.

In case the variations in radius alone do not suffice to determine the dip, the same apparatus illustrated in Figs. 4 and 4A may be used to measure a combination of radius and hardness. This may be accomplished by increasing the outward pressure on the sharp instruments, or by making them sharper, or both. The result will be that the points of the sharp instruments will penetrate further into the rock where it is soft than where it is hard. Thus, if the radius of the hole were everywhere the same and the walls perfectly smooth, the result would be a graphic log showing the variations in the hardness. Since in actual cases there will ordinarily be some variations in the radius of the hole, the result of the use of increased pressure and sharpness would be a log showing the combined effects of both hardness and variations in radius. This log could be used to determine the dip as in the case of the logs showing variations in hardness, for it is not necessary to know which attribute is producing the displacement in order to use it to measure the dip; the essential feature is that the displacement, due to the dip, of irregularities on opposite sides of the hole may be recognized.

When the apparatus illustrated in Figs. 4 and 4A is used to measure the dip, it is important to maintain such a relation between the mass of the main body of the apparatus, the mass of the sharp instruments 82a, b and 95a, b, and the force with which the shafts of the sharp instruments are impelled against the walls of the hole, that there is no appreciable motion of the rigid housing 81a, 81b of the apparatus. In other words, the apparatus must be so massive that the motions of the sharp instruments 82a, b, 95a, b, and the forces impelling said sharp instruments, do not move the rigid housing enough to affect the log. If field conditions prevent the achievement of this condition, the apparatus shown in Figs. 1 and 2 should be used instead.

The manner in which my invention operates may be made clearer by a detailed explanation of the meaning of the graphic logs indicated by numerals 35a and 35b, Fig. 1, and by 101, 102, 103, and 104 Fig. 4. It should be understood that these logs may be used for three purposes: (a) to determine the physical properties and lithology of the strata logged, (b) to determine the dip of the strata from one well, and (c) to correlate the strata between different wells. While a single log of each well suffices for determining the lithology and for correlation, more than one log of each well is required for determining the dip.

The ability of the sharp instrument to penetrate into the walls of the hole is clearly determined chiefly by the hardness of the component mineral grains, and by the degree of cementation or porosity. The rocks in which there will be least penetration will be lightly cemented rocks composed of hard mineral grains, such for example, as quartzite and chert or novaculite. The greatest penetration should normally occur in soft, uncemented shales, clays and sandstones.

The physical and lithologic information obtained from a single trace (i. e., the trace produced by a single one of the four pairs of instruments) may be of value for determining the nature of the rock, for estimating porosity and possibly permeability of oil and gas producing strata, for correlation, and for obtaining exact measurements of the depths of formation contacts.

The qualities of the records produced by the blunt and sharp instruments which make them valuable for determining the dip are the extreme sharpness of the contacts, the detailed character of the record, and the fact that each record will be reproduced with only slight variations on opposite sides of the hole. The determinations of the dip in one well and the correlation of the strata between wells can of course be made without any knowledge of the lithologic nature of the strata logged.

In some wells a further complication is introduced by the deviation of the bore hole from the vertical. If the angle between the bore hole and the vertical is much less than the accuracy required in dip measurements, it will ordinarily be unnecessary to consider this factor. The departure of the rotary-drilled holes from the vertical is known to be much greater in the case of the older wells, most of which are now either cased or abandoned. Any dip measurements made at present on these older wells would have to be restricted to the uncased portions, which ordinarily consist only in the producing horizons and the immediately adjacent strata. Many of the wells now drilled are so nearly vertical that no serious error would be involved in assuming them to be vertical. If the departure from the vertical is large enough to cause important errors, corrections for this factor may be made by utilizing crooked hole surveys already made, by having one made for the purpose, or by attaching an apparatus for measuring the inclination of the hole to the dip-measuring apparatus.

If the diameter of the bore hole is too small for good dip measurements, it might be enlarged by cutting three or four vertical slots up the sides of the hole, and inserting the instruments in them. In case the softer strata have been eroded out, and the harder strata left projecting, it may be possible to obtain dip measurements by recording the displacement in depth of these irregularities on opposite sides of the hole.

The manner of interpretation of the records is illustrated by the imaginary logs shown in Figure 5. The variations in the hardness of the walls of the hole, indicated by the four instruments angularly displaced by 90 degrees are shown by curves 101 to 104. In Figure 5, curve 102 is produced by the instrument opposite the one which produces curve 103. These four curves are similar to each other, but by no means identical, because the hardness of the thin laminations may change slightly even over distances of only 10 inches or 1 foot. If the dip is large enough to be observable, one log will be shifted up or down with reference to the log produced by the opposite instrument. In curves 101 and 102 this shift is A, while in curves 103 and 104 it is B. These distances may, of course, be measured directly from the graphic logs, since the ratio of the vertical distance on the log paper to depths in the well is known. Curve 85, Fig. 5, is a graph indicating the orientation of one of the pairs of logs with reference to the points of the compass.

In Figure 5, let it be assumed that the diameter of the hole is 10 inches, and that the distance A represents 0.3 inch of depth, and the distance B 2.1 inches. Then the dip along the line from 1 to 2 is 3% and between 3 to 4 21%.

It is, of course, necessary to know the direction of the strike of the strata, and the amount of dip in a direction at right angles to the strike. These may be determined by the following simple rules: (A) The true dip, at right angles to the strike, is the square root of the sum of the squares of the two dips at right angles to each other (measured in per cent). (B) The strike of the strata is the bearing of the lesser dip plus the angle whose tangent is the lesser dip divided by the greater dip (both measured in per cent). If the bearing of the lesser dip is measured in degrees from 0 to 360 clockwise with true north at zero, then the angle added to the bearing of the lesser dip will be plus if the direction from greater to lesser dip is clockwise, and minus if it is counterclockwise. For example, if the greater dip is 4% and the lesser dip 3%, the maximum dip must be 5%. If, in this example, the direction of the greater dip is north 30 degrees east, and the direction of the lesser dip is south 60 degrees east, or 120 degrees measured clockwise from north, then the direction of the strike is 120 plus arc tan 3/4, or 120 plus 37 degrees=157 degrees, clockwise from north.

These statements are obvious from Fig. 6 which is a vector diagram of the dips, OB being the greater of the two dips and OC the lesser. The value of the maximum dip is clearly given by OD, which is the square root of the sum of the squares of OB and OC. The direction of the maximum dip is given by OD, which makes the angle $$DOB = \arctan \frac{BD}{OB} \text{ with } OB$$

The scale on which the four logs showing variations in hardness are plotted must be large enough to permit measuring the smaller depth differences needed to secure the desired accuracy. Where great accuracy is desired, it would be advisable either to log only certain important sections of the well, or to use an automatic method for logging the dips, which would involve plotting only the angle of the dip and the bearing of one of them.

The method of measuring dips in one well by the process here described has many uses, both in wells drilled for oil and gas and in bore wells put down in developing deposits of metallic ores and other minerals. The method is capable of measuring accurately the changes in dip with depth, which may be useful for locating faults, unconformities, zones of shearing and crushing, drag folds, cross-bedding and other structural features. Unconformities, if angular, will be definitely indicated by the change in dips. The determination of the exact depth at which faults intersect the wells may be in many areas determined by the drag, by the difference in the dips above or below the fault plane, or by the detection of crushed or contorted zones or fault gouge. The logs may also be used to detect or measure the dips of schistocity, flow structure, shear zones, joints, and shale layers in formations producing oil and gas. Another application of my invention is for logging shallow test holes put down to determine the structure. The logs of the variations in hardness may afford a basis for correlating these wells, and the measurements of the amount and direction of the dip may permit the structure to be mapped more accurately or with less expense for drilling than with the methods now in use.

Logs showing the differential movement of blunt and sharp instruments pressed against the walls of the hole may also be used to indicate the size of fractures and cavities such as are likely to produce oil and gas, for determining the lithologic nature of rocks, and for measuring various physical properties, such as porosity and permeability. The porosity of a rock is clearly related to its hardness, the softer portions being generally more porous. Furthermore, in certain rocks which yield oil and gas production, the oil is obtained from open cavities or fractures of sufficient size to be detected by the differential motion of the blunt and sharp instruments. These cavities would be indicated by sharp irregularities in the curves. It may also be possible to distinguish pores and cavities from softer layers by the great hardness or resistance to penetration of the softer rocks compared with the open cavities, which are filled with fluid.

The permeability of the rocks is determined by the diameter of the cavities or pores, and this in turn may be estimated from the records. In the case of sandstones, the permeability is closely related to both the hardness of the rock and the diameter of the sand grains composing it. The first may be determined by the differential penetration of the blunt and sharp instruments, and the second by the frequency of the minute irregularities due to the individual grains. In making a record of this nature it would, of course, be advisable to use sharp instruments that are very minute, and to record the number of reversals of current per unit distance instead of a graphic record of the variation in current.

I claim:

1. In a surveying device for recording characteristics of the formations traversed by a bore hole, a caliper tool adapted to being lowered into said bore hole, said tool having pairs of contiguous arms mounted for independent movement in radial planes extending through the axis of said bore hole, said arms having blunt and sharp contact portions, respectively, and adapted to contact contiguous areas of the wall of the bore hole to engage the surface of said formations, and mechanism connected with said arms for recording the relative movements thereof.

2. In a surveying device for recording characteristics of the formations traversed by a bore hole, a caliper tool adapted to being lowered into said bore hole, said tool having pairs of arms mounted for independent movement in radial planes extending through the axis of said bore hole, said arms having blunt and sharp contact portions, respectively, and adapted to contact contiguous areas of the wall of the bore hole to engage the surface of said formations, and mechanism for recording the relative movements thereof, said mechanism comprising a variable resistor, means responsive to said relative movements for varying said resistor, an electrical circuit connected to said variable resistor, a supply of current for energizing said circuit, whereby the output of said circuit varies in a definite relationship to the variation of said resistor, and a recorder connected to the output of said circuit.

3. A caliper tool adapted for use with an electrical system, in making a caliper log of a bore hole including, in combination, a housing adapted to be lowered into said bore hole, variable resistor means in said housing, caliper arms pivoted to said housing, said arms having blunt and sharp contact portions, respectively, and being mounted for independent movement in radial planes extending through the axis of said bore hole and adapted to contact contiguous areas of the wall of said bore hole to engage the surface irregularities of the bore hole, means operatively connected to said variable resistor means and to said caliper arms for varying the resistance of said variable resistor means in response to relative motion of the arms, and means for indicating said variations in resistance.

4. In a measuring and recording device for making records of bore hole surveys, a body member adapted to be lowered into a bore hole, pairs of contiguous and independently journaled arms supported at diametrically opposite sides of said body member and each arm of a pair having independent movement responsive to surface irregularities of said bore hole, one arm of each pair having at its contact end a relatively large surface area, whereby it makes a relatively large area of contact with the bore hole, the other arm of each pair having at its contact end a relatively small area of contact with said bore hole, spring members interposed between said body member and arms for propelling said arms outwardly into contact with the walls of the bore hole, and mechanism operatively connected with said arms for recording relative movements of them, whereby variations in the character of said bore hole are measured.

5. In a device for surveying bore holes, the combination of a body member adapted to be lowered into a bore hole, a vertical rigid member connected to said body member, to be aligned with the central axis of said bore hole, a plurality of pairs of arms pivotally attached to said member, the arms of each pair being mounted for independent movement in radial planes extending through said central axis and adapted to contact walls of said bore hole for engagement with surface irregularities of said bore hole, one arm of each pair having at its contact end relatively large surface area, whereby it makes a relatively large area of contact with the bore hole, the other arm of each pair having at its contact end a relatively small area of contact with said bore hole, spring members interposed between said vertical member and arms for propelling said arms outwardly into contact with the walls of the bore hole, and mechanism operatively connected with said two arms for recording the relative movements of them.

6. In a well surveying device for exploring the formation adjoining a bore hole, the combination of a conductor cable, an assembly attached to said cable to be lowered into a well bore, said assembly comprising a body member, pairs of contiguous and independently journaled arms supported at diametrically opposite sides of said body member, and each arm of a pair having an independent movement responsive to surface irregularities of said bore hole, one arm of each pair having at its contact end a relatively large surface area, whereby it makes relatively large area of contact with the bore hole, the other arm of each pair having at its contact end a relatively small area, spring members interposed between said body member and arms for propelling said arms outwardly into contact with the walls of the bore hole, a variable resistor mounted on said body member and operatively engaged with said arms, means for varying the resistance of said variable resistor in response to the relative motion of said arms, an electric circuit connected to said resistor, said circuit being connected to said conductor cable, means for energizing said circuit and indicating means attached to said conductor cable at the mouth of the bore hole, whereby the relative motions of said arms may be observed by the variations in the electrical conditions in such circuit.

7. In a well surveying device for measuring the radial variations in a bore hole, the combination of an assembly adapted to be lowered into a bore hole, said assembly including a body member, said body member comprising an elongated bar aligned along the central axis of said body member, pairs of contiguous and independently journaled arms pivotally supported at diametrically opposite sides of said bar and each arm of a pair having an independent movement responsive to surface irregularities of said bore hole, one arm of each pair having at its contact end a relatively large surface area, whereby it makes relatively large area of contact with the bore hole, the other arm of each pair having at its contact end a relatively small area, spring members interposed between said body member and arms for propelling said arms outwardly into contact with the walls of the bore hole, variable resistors mounted on said body member and operatively engaged with said arms, means for varying the resistance of variable resistors in response to the relative motion of said arms, an electric circuit connected to said resistors, means for energizing said circuit, and an indicating means connected to said circuit for indicating the variation of said resistance.

8. In a surveying device for recording the inclination of strata traversed by a bore hole, a caliper tool adapted to being lowered into said bore hole, said tool having at least two pairs of arms mounted therein, each said pair consisting of a pair of arms having blunt and sharp contact portions, respectively, which are adapted to contact contiguous areas of the walls of the bore hole to engage the surface of said formation and adapted for independent movements in radial planes extending from the axis of said bore hole, said radial planes being in a definite geometrical relation to each other, each of said mechanisms being individually and independently connected to each of said pairs of arms for separately and independently recording the relative motion of the arms comprised in said pair, said relative motion being referred to the depth of said bore hole while said caliper tool is being moved in said hole, whereby by comparing said independent records, in particular relation to the depth in the well, the inclination of said strata may be determined.

9. In a surveying device for recording the dip of strata traversed by a bore hole, a caliper tool adapted to being lowered into said bore hole, said tool having a plurality of pairs of arms mounted therein, each said pair consisting of arms having blunt and sharp contact portions, respectively, which are adapted to contact contiguous areas of the walls of the bore hole to engage the surface of said formation and adapted for independent movements in radial planes extending from the axis of said bore hole, said radial planes being in a definite geometrical relation to each other, each of said mechanisms being individually and independently connected to each of said pair of arms for separately and independently recording the relative motion of arms comprised in said pair, said relative motion being referred to the depth of said bore hole while said caliper tool is being moved in said hole, whereby by comparing said independent records in particular relations with respect to depth in the well, the dip of said strata may be determined.

WILLIAM L. RUSSELL.